United States Patent [19]

Chateau et al.

[11] Patent Number: 4,699,379
[45] Date of Patent: Oct. 13, 1987

[54] ATHLETIC MONITORING DEVICE

[75] Inventors: Robert E. Chateau, 7171 Hillrose St., Tujunga, Calif. 91042; Carl S. Baldwin, Sunland, Calif.

[73] Assignee: Robert E. Chateau, Tujunga, Calif.

[21] Appl. No.: 852,094

[22] Filed: Apr. 14, 1986

Related U.S. Application Data

[63] Continuation of Ser. No. 576,639, Feb. 3, 1984, abandoned.

[51] Int. Cl.⁴ .............................................. A63B 71/06
[52] U.S. Cl. .............................. 273/54 B; 273/26 R; 273/29 A; 273/183 B; 273/186 C
[58] Field of Search .............. 273/1 GC, 1 GD, 26 R, 273/29 A, 35 R, 54 R, 54 B, 183 R, 183 B, 183 D, 186 R, 186 A, 186 C; 434/247, 249, 252

[56] References Cited

U.S. PATENT DOCUMENTS

| | | |
|---|---|---|
| 2,064,603 | 12/1936 | Harrison . |
| 2,223,849 | 5/1939 | Fogler et al. . |
| 3,275,835 | 1/1964 | Morrison . |
| 3,295,378 | 1/1967 | Hirtreiter . |
| 3,301,559 | 8/1964 | Jolley . |
| 3,480,908 | 5/1968 | Codina . |
| 3,527,106 | 1/1967 | Hirtreiter . |
| 3,583,226 | 1/1974 | Codina . |
| 3,664,196 | 5/1972 | Codina . |
| 3,788,647 | 1/1974 | Evans . |
| 3,789,674 | 2/1974 | Anderson et al. . |
| 3,808,707 | 4/1972 | Fink . |
| 3,815,427 | 6/1974 | Gladstone . |
| 3,945,646 | 3/1976 | Hammond ..................... 273/186 A |
| 3,953,034 | 4/1976 | Nelson . |
| 4,027,535 | 6/1977 | Swanson . |
| 4,193,065 | 3/1980 | Bittner . |
| 4,239,963 | 12/1980 | August et al. . |
| 4,277,895 | 7/1981 | Wiklund . |
| 4,330,123 | 5/1982 | Kleinerman ..................... 434/249 |
| 4,337,049 | 6/1982 | Connelly ........................... 434/247 |

Primary Examiner—Richard C. Pinkham
Assistant Examiner—MaryAnn Stoll Lastova
Attorney, Agent, or Firm—Spensley Horn Jubas & Lubitz

[57] ABSTRACT

An athletic monitoring device for attachment to a portion of an athlete'body or to athletic equipment. The device measures a predetermined parameter of the motion of the device while in use and compares the measured parameter to a predetermined range. Intensity of acceleration is measured by taking the square root of the sum of the squares of acceleration data for each of the three axes of motion. This value is compared to a threshold value. If greater than the threshold value, the square root value is stored and added to a second measured intensity value. In this manner, a sum of intensity values throughout a stroke is calculated. If the sum of intensities is above or below a predetermined range, appropriate signalling will so indicate.

1 Claim, 5 Drawing Figures

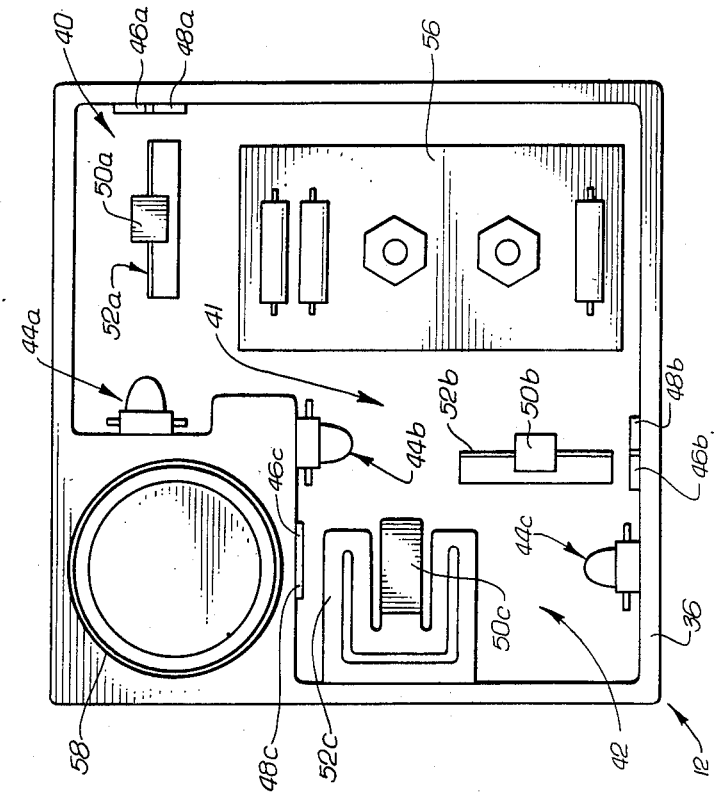
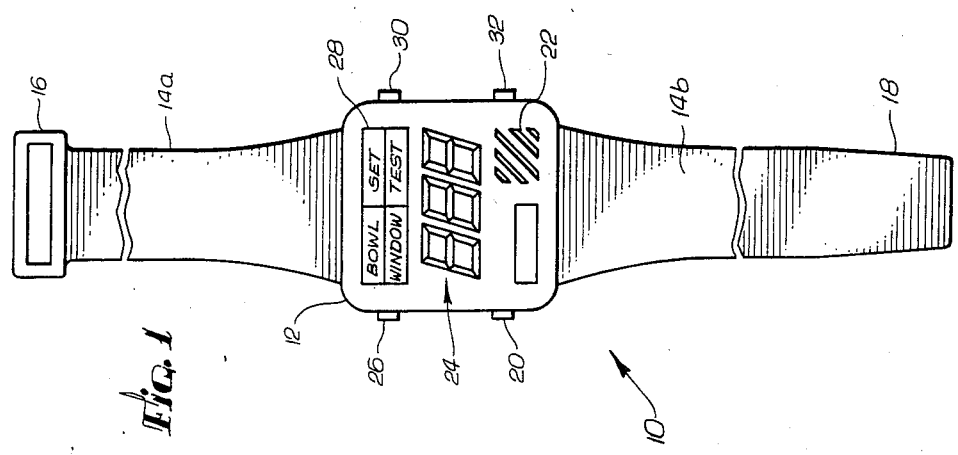

BOWL MODE

DATA ACQUISITION

ATHLETIC MONITORING DEVICE

This is a continuation of application Ser. No. 576,639 filed on Feb. 3, 1984, now abandoned.

BACKGROUND OF THE INVENTION

1. Field of the Invention.

The present invention relates to biofeedback devices, and in particular, to such devices for improving athletic performance.

2. Description of the Prior Art.

A biofeedback device monitors a particular human activity and provides "feedback" information to the participant, which indicates some quality or characteristic relating to the performance of that activity. The participant uses the feedback information to modify or improve the performance of the activity relative to some standard.

Many such devices have been proposed to improve various sports activities such as the golf swing of a golfer, the bowling ball delivery of a bowler or the swing of a baseball hitter. For example, U.S. Pat. No. 3,301,559 to Jolley describes a wrist-worn device which is intended to provide an indication as to the particular form which the bowler exhibits as the bowler bowls the bowling ball. The Jolley device is entirely mechanical in nature and is not readily adaptable to indicate the correct execution of any bowling form other than the one for which it is designed. In bowling, there is no one correct form so that the Jolley device may not be suitable for many bowlers.

Other devices such as those shown in U.S. Pat. No. 3,815,427 to Gladstone and 4,205,535 to Swanson measure the peak acceleration or velocity of the head of a golf club or a portion of the body such as an athlete's hand. However, for many sports such as bowling, in which the total acceleration during a certain interval is an important factor, a measurement such as the peak velocity or peak acceleration of the movement may not be particularly helpful in encouraging consistency of the overall movement of the arm or wrist.

Kleinerman, U.S. Pat. No. 4,330,123, describes a wrist-worn device which emits an audio signal when the bowler's arm reaches a pre-determined attitude. This predetermined attitude is not readily changeable in the Kleinerman device such that the device may not be suitable for all bowling styles. Furthermore, the Kleinerman device apparently emits a signal only when the desired attitude (or a predetermined approximation thereof) is achieved. The range of attitudes at which the Kleinerman device will emit a "correct attitude" signal is also not readily changeable by the bowler. Thus, the Kleinerman device might be too frustrating for use by beginners if the predetermined range is too small or may be useless for highly skilled bowlers if the predetermined range is too large. Still further, the Kleinerman device apparently provides no indication as to whether the attitude of the bowler's arm following the release of the ball was either too high or too low, but merely whether or not the attitude was correct.

Still another athletic monitoring device is shown by Evans, U.S. Pat. No. 3,788,647. This device has a plurality of accelerometers for measuring the swing of an athlete's arm. The data sensed by the accelerometers are transmitted to a receiver for comparison and analysis. Thus, the Evans device is not fully self-contained and may therefore be impractical for many applications where a receiver cannot be accommodated.

SUMMARY OF INVENTION

It is an object of the present invention to provide an athletic monitoring device obviating, for practical purposes, the above-mentioned limitations.

The present invention provides a fully self-contained athletic monitoring device which is sufficiently portable to be worn about the wrist of an athlete. The device measures a predetermined parameter of the motion of a portion of an athlete's body or the motion of a portion of athletic equipment being moved by the athlete. This measured parameter is compared to a predetermined range and a signal is provided to the athlete to indicate the results of that comparison. In one feature of the present invention, the device has user operable inputs by which the athlete can set the predetermined range in accordance with his particular style and skill level. Consequently, an athlete of relatively low skill can input a relatively large range and, as his consistency improves, the athlete can narrow the range. Thus, the device is suitable for use by athletes of varying skill levels.

In another feature of the present invention, the device provides a first audio signal if the measured parameter exceeds the predetermined range and also provides a second audio signal if the measured parameter is less than the predetermined range. In the illustrated embodiment of the present invention, the parameter measured by the athletic monitoring device is the vigor or intensity by which a bowling bowl is bowled. If the bowling ball is bowled within the predetermined range, a third signal is emitted, which in the illustrated embodiment, is a silent signal. By having three different audio signals which indicate whether the ball was thrown too hard, too soft, or within the pre-determined range, the learning efficiency of the user is increased and the user can achieve a more consistent bowling motion faster. Furthermore, the audio signal obviates the need for the bowler to look at the device in order to determine whether the intensity of the ball delivery was within the range, increasing the convenience of the device.

In the illustrated embodiment of the present invention, the athletic monitoring device has sensors for sensing the acceleration of the body or equipment portion while in motion. The sensed acceleration data is collected over an interval of the motion being measured so that the measured intensity is not a peak measurement but is, instead, a function of all the acceleration data collected over the interval. Such a measurement parameter is often more indicative of the desired overall motion than are peak measurements.

DETAILED DESCRIPTION OF THE DRAWINGS

FIG. 1 is a pictorial view of a wrist-worn athletic monitoring device in accordance with a preferred embodiment of the present invention;

FIG. 2 is a schematic diagram of the internal physical layout of various components of the module of the device in FIG. 1;

DETAILED DESCRIPTION OF THE DRAWINGS

Figure 3:
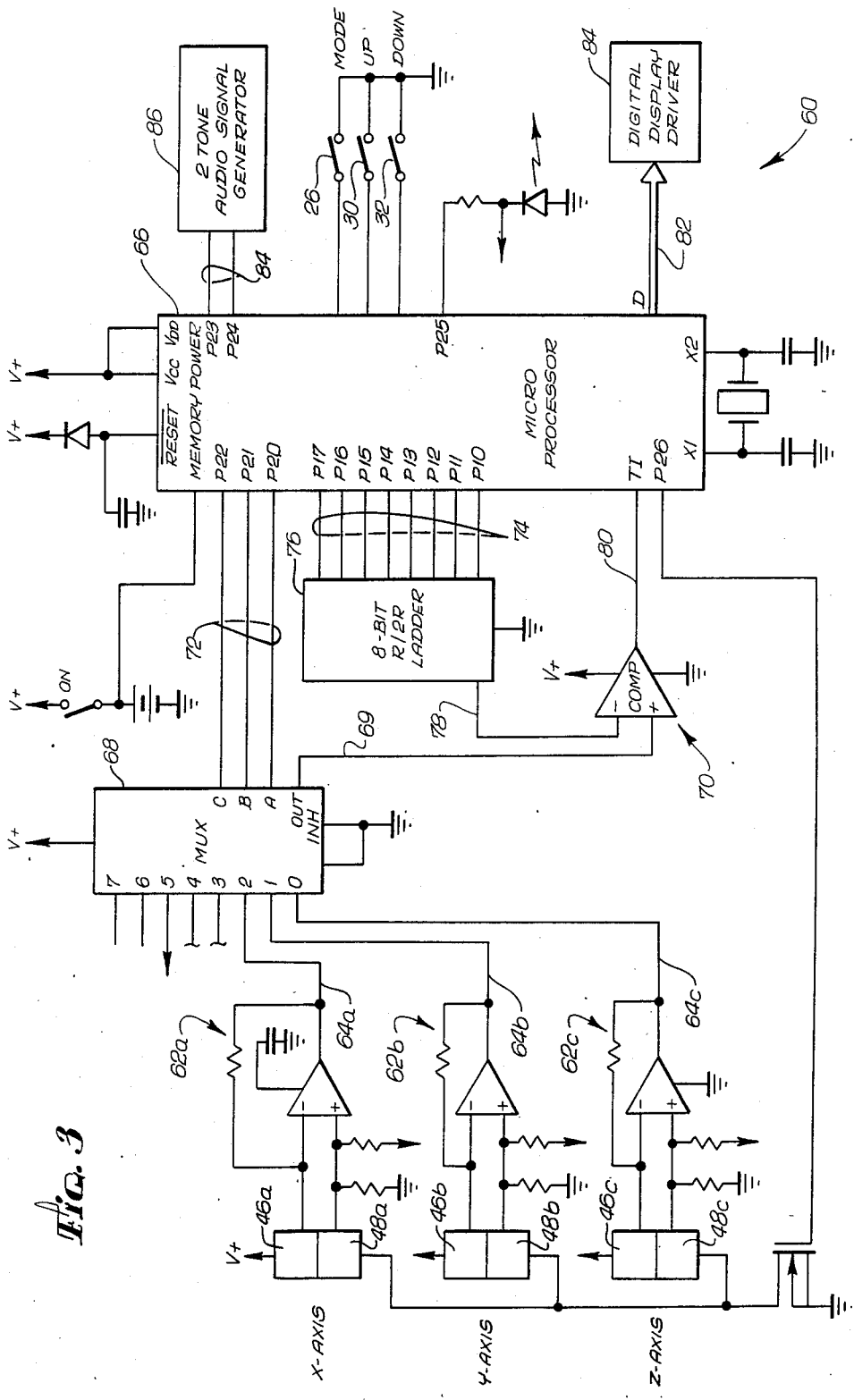
FIG. 3 is a schematic diagram of the electronic circuitry of the device of FIG. 1.

Referring now to FIG. 1, an athletic monitoring device in accordance with a preferred embodiment of the present invention is indicated generally at 10. The device 10 is a wrist-worn monitoring device which measures the intensity or vigor by which a bowler bowls a bowling ball. The measured intensity is a function of the total acceleration of the device over a particular interval of the bowling delivery motion. It is recognized that the device may be used to measure the intensity of other motions such as the movement of the wrist of a billiard player driving a billiard cue forward, or adapted to measure the motion of the head of a golf club. It should be further recognized that the device 10 may be readily modified to measure other parameters of motion such as the direction of travel.

The device 10 is worn about the wrist of the bowler's bowling arm and includes a module 12 and a pair of wrists bands 14a and 14b attached to the module 12. The wrist bands 14a and 14b are secured about the bowler's wrist by a Velcro fastener carried on the bands 14a and 14b. The wrist band 14a has a loop 16 through which the free end 18 of the other wrist band 14b may be inserted.

The device 10 is activated by means of a pushbutton on/off switch 20. When activated, the device 10 senses the motion of the bowler's wrist while the bowling ball is being delivered and computes a value representative of the intensity by which the ball has been thrown. This computed intensity value is compared to the range of desired intensity values which has been preset by the bowler. The device 10 emits a high frequency audio tone through a speaker 22 if the computed intensity value exceeds the preset range of intensity values, a low frequency tone if the computed intensity value is below the preset range and no tone if the computed intensity value is within the preset range. Thus, after each bowl, the bowler is immediately given a feedback signal in the form of an audio tone or no tone, which indicates whether the bowler has bowled the ball with an intensity which is within the preset range.

In the illustrated embodiment, the computed intensity value is a three digit number which is displayed on the module 12 by a 3-digit display 24. The preset range is defined by a "set" value and a "window" value which are inputed into the device 10 by the bowler. The set value defines the mid-point of the range and the window value defines the size of the range centered about the set or mid-point value. For example, a set value of 125 and a window value of 6 defines an intensity range from 122 to 128.

The set value is inputted by depressing a pushbutton mode switch 26 until the word "SET" appears in an LCD mode indictor display 28 of the module 12. The set value last inputted into the device 10 is recalled from memory and is displayed by the 3-digit display 24. A larger set value may be selected by depressing an "up" pushbutton switch 30 which causes the number displayed in the display 24 to automatically increment a unit at a time. When the new desired set value appears in the display 24, the up button 30 is released. Similarly, the set value displayed in the display 24 may be decremented downward by depressing a "down" button 32.

There is no one correct intensity set value for all bowlers. Each bowler bowls the ball with a different intensity depending upon the individual bowler's style, size and strength. To achieve a high score, it is not necessary that the ball be thrown hard. Consequently, the monitoring device 10 of the present invention allows the bowler to input the desired intensity value in accordance with his or her own bowling style. Set values for men typically vary between 100 and 150, and between 75 and 104 for women.

The device 10 compares the measured intensity value computed after each ball delivery with the set intensity value inputted by the bowler, and indicates to the bowler whether the bowler has thrown the ball with an intensity sufficiently close to the preset intensity. By consistently throwing the ball with the same intensity which is correct for that particular bowler, the bowler can improve his or her score.

The abililty of the bowler to control the consistency of the bowling motion depends upon the skill level of the bowler. The device 10 allows the bowler to input the size of the allowable range about the set value in accordance with the bowler's ability. The size of the range (or window value) is inputted by depressing the mode button 26 until the word "WINDOW" appears in the display 28. The window value last inputted into the device 10 then appears in the display 24 and may be incremented or decremented as desired by depressing the up and down buttons 30 and 32, respectively, as described above in connection with the inputting of the set value. For bowlers capable of averaging a bowling score in excess of 200, a window value of 6 to 8 may be appropriate whereas a 150 score bowler would likely find a window value of 12 appropriate. A bowler whose bowling score usually falls below 150 should input a still larger window value. After inputting the set and window values defining the desired range, the bowler depresses the mode button 26 until the word "BOWL" appears in the display 28, indicating that the device is ready to measure and compare the intensity of the bowler's bowling motions.

FIG. 2 is a schematic diagram of the internal layout of the module 12 of the device 10. Mounted within the housing 36 of the module 12 are three accelerometers 40–42 for measuring the acceleration of the device 10 in three orthogonal axes of motion designated X, Y and Z, respectively. The accelerometer 40 has a light-emitting diode (LED) 44a which is aligned to illuminate a pair of photovoltaic cells 46a and 48a. The accelerometers 41 and 42 similarly comprise an LED (44b, 44c) and a pair of photovoltaic cells (46b, 46c and 48b, 48c (not shown)).

Each accelerometer further has a mass 50a–50c which is suspended by a spring 52a–52c between the LED and the pair of photovoltaic cells of the accelerometer. Each spring resiliently supports the associated mass in a manner which substantially restricts the motion of the mass to a single plane. The masses 50a–50c and springs 52a–52c are mounted in the housing 36 of the module 12 so that the three planes of motion of the masses 50a–50c are oriented orthogonally.

These three orthogonal planes contain the three mutually orthogonal X, Y and Z axes of motion. If the module 12 is accelerated along the X axes the mass 50a is also deflected along the X axis (in the opposite direction) against the resiliency of the spring 52a. Accelerations of the module 12 along the Y and Z axes produce corresponding motions of the masses 50b and 50c, respectively. Each of the three masses 50a–50c are positioned between the associated LED and pair of photovoltaic cells such that the mass shades approximately 50% of each photovoltaic cell of the accelerometer from the illumination of the associated LED. Acceleration of the module 12 along the X axis deflects the mass 50a such that the proportional shading of the photovoltaic cells 46a and 48a of the accelerometer 40 is changed. Each photovoltaic cell has an output voltage which is dependent upon the incident light on that cell. Consequently, the acceleration of the mass 50a along the X axis may be sensed by comparing the relative voltages produced by the photovoltaic cells 46a and 48a. Similarly, the acceleration of the masses 50b and 50c in the Y and Z axes, respectively, may be sensed by comparing the relative voltage outputs of the pairs of photovoltaic cells of the accelerometers 41 and 42, respectively. It is recognized that other types of accelerometers such as the "G-Clip" accelerometers sold by INSOUTH ELECTRONICS may be used.

The relative voltages of the photovoltaic cells of the accelerometers 40-42 are compared and processed by processing circuitry 60 (FIG. 3) carried on a circuit board 56 mounted within the housing 36. The module 12 also includes a battery compartment 58 in one corner of the housing 36.

FIG. 3 shows an example of the circuitry 60 which processes the output signals of the accelerometers 40-42 as shown in FIG. 2 generate a value which is representative of the intensity by which the bowling ball was bowled. The processing circuitry 60 also compares the measured value to the desired range inputted by the bowler and outputs an audio signal in accordance with that comparison as previously described. The processing circuitry 60 includes three differential amplifiers 62a-62c, each of which has an inverting input coupled to an output of one of the photovoltaic cells 46a-46c of each pair of the accelerometers 40-42. The outputs of the other photovoltaic cells 48a-48c of the cell pairs are coupled to the non-inverting inputs of the amplifier 62a-62c, respectively.

The amplifier 62a produces an analog voltage signal at an output 64a, the magnitude and polarity of which is representative of the acceleration of the module 12 along the X axis. Similarly, the amplifiers 62b and 62c produce voltage signals at outputs 64b and 64c respectively, which are representative of the acceleration of the module 12 along the Y and Z axes, respectively.

The processing circuitry 60 further includes a microprocessor 66 and a multiplexer 68. In the illustrated embodiment, the microprocessor 66 is an Intel 80C48 CMOS integrated circuit. The multiplexer 68 selectively couples one of the amplifier outputs 64a-64c, to the non-inverting input of a comparator circuit 70. The microprocessor 66 has a three-bit output bus 72 coupled to the control input of the multiplexer 68 to control the selection of the amplifier outputs.

The microprocessor 66 converts the analog voltage from the selected amplifier to a digital representation utilizing the successive approximation technique in the illustrated embodiment. A machine language program for programming the microprocessor 66 is set out in the Appendix. The microprocessor 66 outputs an 8-bit digital representation at an 8-bit output bus 74, which approxmates the analog value to be converted. The bus 74 is coupled to the input of an 8-bit R/2R ladder circuit 76 which converts the 8-bit digital representation to an analog value at an output 78. The comparator circuit 70 compares the analog value at output 78 to the selected analog acceleration value from the multiplexer output 69 and outputs a logical one or zero at output 80 to the microprocessor 66 depending upon the comparison of the analog values. The microprocessor 66 successively tests and changes each bit of the 8-bit representation at output 74 until the analog value of output 78 most closely matches the analog acceleration value from the multiplexer 68. In this manner, the microprocessor converts the analog acceleration value to a digital representation.

The microprocessor 66 in accordance with the internal program of the microprocessor, computes a value from the collected digital acceleration data, which indicates the intensity with which the ball was bowled. This computed intensity value is displayed by the three-digit display 24 (FIG. 1) after the ball has been released. The microprocessor 66 outputs the computed intensity value at an output 82 which is coupled to a digital display driver circuit 84. The driver circuit 84 drives the three-digit display 24 of the module 12 as controlled by the microprocessor 66.

The computed intensity value is also compared to the preset intensity range input by the bowler. The microprocessor 66 has three inputs coupled to the mode input switch 26, the up switch 30 and the down switch 32, respectively for inputting the desired range. As previously mentioned the bowler selectively actuates the switches 26, 30 and 32 to input the set and window values defining the desired intensity range. When the switch 26 has been depressed a sufficient number of times to place the device 10 in the set mode, the microprocessor 66 reads the last stored set value from memory and displays it on the three-digit display 24 via the digital display driver 84. The microprocessor 66 then increments or decrements the displayed set value in accordance with the actuation of the switches 30 and 32 by the user.

When satisfied with the display set value, the user depresses the mode switch 26 once more which places the device 10 in the window mode. At that time, the microprocessor 66 stores in memory the last displayed set value as the new set value for the intensity range, and reads the last stored window value from memory and displays it at the display 24. The user may modify the displayed window value as before with the up and down switches 30 and 32. When satisfied with the displayed window value, the user depresses the mode switch 26 once more which causes the microprocessor 66 to store the last displayed window value in memory as the new window value defining the range.

The device 10 has an additional mode designated the test mode. In this mode, the "BOWL", "SET" "WINDOW" and "TEST" indicia are all activated so that the user can verify that the display 28 operates properly. Furthermore, a calibration number is displayed in the display 24 which indicates whether the accelerometers 40-42 and the processing circuitry 60 are operating properly.

When placed in the bowl mode, the microprocessor 66 computes the intensity of each bowling motion and compares the measured intensity value to the intensity range inputted by the bowler. The microprocessor has an output bus 85 coupled to a two-tone audio signal generator circuit 86, the output of which is connected to the speaker 22 of the device 10 (FIG. 1). If the measured intensity value is within the preset range, no tone is sounded. Otherwise, a high frequency tone is sounded if the intensity range is exceeded, and a low frequency tone is sounded if the measured intensity value is below the intensity range.

In the illustrated embodiment, the measured intensity value is computed in accordance with the following expression:

$$I = \sum_{t_1}^{t_2} ((x^2 + y^2 + z^2)^{\frac{1}{2}} - T_1) \quad (A)$$

where I is the measured intensity value, the variables x, y and z are measured acceleration values along the X, Y and Z axes, respectively, and the quantity $T_1$ is a predetermined threshold value. The intensity value I is measured over an interval of the bowler's swing which is initiated at time $t_1$ defined as when the quantity $(x^2+y^2+z^2)^{\frac{1}{2}}$ is found to be greater than the threshold $T_1$. The measurement interval is terminated at $t_2$ when the measured quantity $(x^2+y^2+z^2)^{\frac{1}{2}}$ is found to fall below the threshold $T_1$.

Figure 4A:
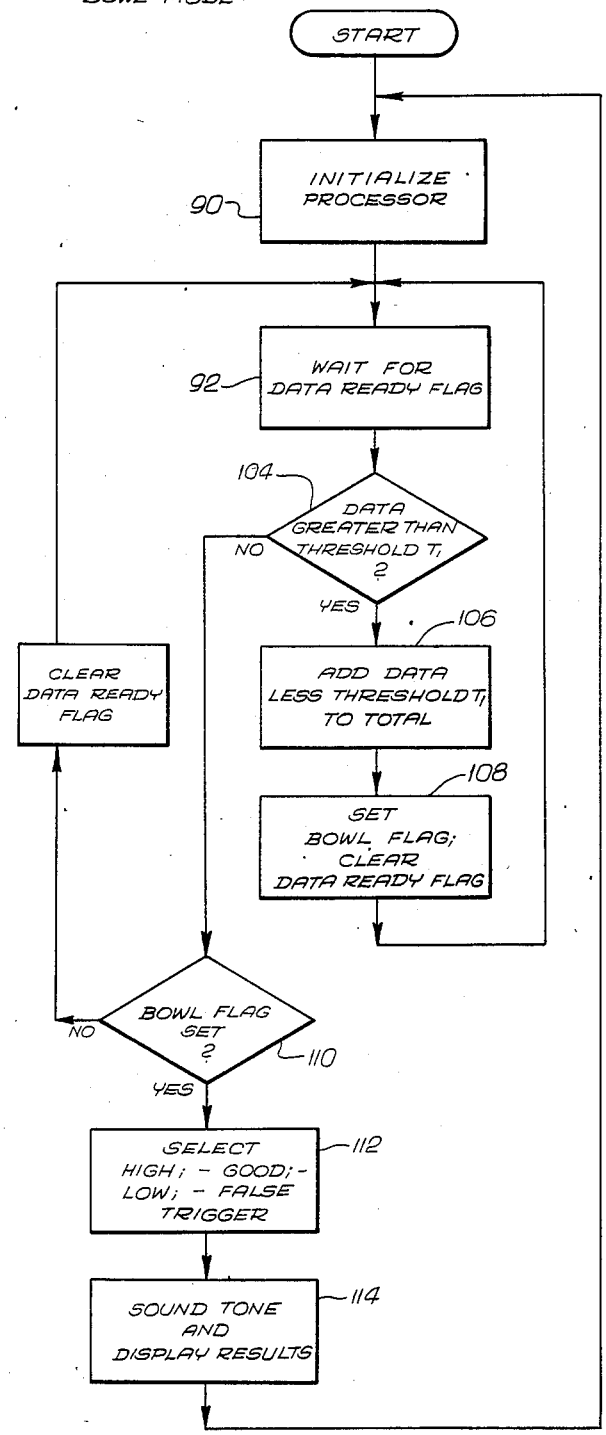
FIGS. 4A and 4B are flow-charts illustrating the programming of the microprocessor of the circuit in FIG. 3.
Figure 4B:
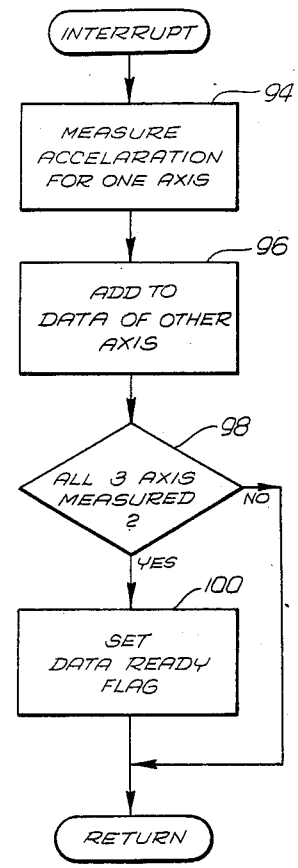

FIGS. 4A and 4B are flow charts which describe the operation of the processing circuitry 60 in the bowl mode. Referring first to FIG. 4A, the microprocessor 66 upon the start of the bowl mode, initializes the processing circuitry 60 as indicated in the instruction block 90. In this step, the microprocessor 66 clears data memory locations and initializes the multiplexer 68 to couple the output line 64a of the X-axis differential amplifier 62a to the comparator 70. Upon completion of these tasks, the program proceeds to instruction block 92 at which the microprocessor 66 waits for a "data ready" flag to be set. This flag is set by a data acquisition subroutine which is flow-charted in FIG. 4B.

The data acquisition subroutine is called by an interrupt signal which in the illustrated embodiment, is generated by a clock circuit every three milliseconds. When called, the data acquisition subroutine samples the acceleration of the module 12 in one of the three axes of motion as indicated in instruction block 94 of FIG. 4B. As previously mentioned, the multiplexer 68 is initially set to input the analog voltage signal from the first differential amplifier 62a to the comparator 70. Consequently, the X axis analog acceleration value is first inputted by the multiplexer 68. The microprocessor 66 converts this value to a digital representation and squares it in accordance with the expression set forth above.

Proceeding to the next instruction block 96, the microprocessor adds the squared digital acceleration data to a memory location in which the sum of the squares acceleration data of all three axes is totaled and stored. A second memory location which contains a pointer number which controls the multiplexer 68, is then incremented so that the analog data from the next accelerometer is inputted the next time the data acquisition subroutine is called.

Proceeding to decision block 98, if all three axes have not been sampled, control is returned to the routine of FIG. 4A such that the microprocessor program state is returned to decision block 92. There, the microprocessor will continue waiting until the next clock driven interrupt signal is received which calls the data acquisition subroutine again. Since the pointer number was previously incremented, the acceleration data from the Y-axis accelerometer is converted to a digital representation, squared and added to the acceleration data memory location in instruction block 96. After the subroutine of FIG. 4B has been called three times so that the data memory location has the data total for all three axes, control proceeds to instruction block 100 at which the data ready flag is set. In addition, the square root of the data in the data memory location is computed and moved to a new location. The previous acceleration data memory location is then cleared for the next acceleration data samples.

With the data ready flag set, the program proceeds to decision block 104 (FIG. 4A) in which the computed acceleration data $(x^2+y^2+z^2)^{\frac{1}{2}}$ is compared to a predetermined threshold $T_1$. The value of the threshold $T_1$ is selected to be approximately equal to the acceleration normally exerted on the masses 50a–50c by the earth's gravitational field, plus a predetermined margin value. If the acceleration data is greater than the threshold $T_1$, the module 12 is considered to be experiencing acceleration resulting from movement of the module 12 in addition to the earth's gravitational field. Thus, if the computed acceleration data is greater than the threshold $T_1$, the decision block 104 passes control to the instruction block 106 where the acceleration data (less the threshold $T_1$) is added to a memory location which stores the accumulated total of the acceleration data during the bowling motion in accordance with the expression (A) above. Then, a "bowl" flag is set (instruction block 108) which indicates that the bowler's wrist is considered to be in motion. In addition, the data ready flag is cleared. Control is then passed back to the instruction block 92 where the microprocessor waits for the data ready flag to be set again, indicating that the data acquisition subroutine has been called three more times by which the acceleration on the three axes is sampled again.

The processing circuitry 60 continues cycling through the instruction block 92, decision block 104, and instruction blocks 106 and 108, collecting additional acceleration data for the three axes and adding the computed data to the accumulated total until the computed acceleration data is found to be less than the threshhold $T_1$ by the decision block 104. At that time, control passes to a second decision block 110 which tests the bowl flag to see if it has been set. If so, the receipt of a computed acceleration data which is lower than the threshhold $T_1$ marks the end of the measurement interval and the data totaled in instruction block 106 is the measured intensity value I of the bowling motion in accordance with expression A above.

The measured intensity value I is compared to the desired intensity range in instruction block 112. If the measured intensity value I is within the range preset by the user, no tone is emitted. However, if the measured intensity range exceeds the preset range, a high frequency tone is emitted (block 114), and a low frequency tone is emitted if the measured intensity value falls short of the input range. However, if the measured intensity value is less than 50 percent of the set value, the collected acceleration data is considered to be a "false trigger" and no tone is emitted. In this manner, the device 10 is able to distinguish a normal bowling motion from the haphazard movements of the bowler's arm while the device is in the bowl mode.

It will, of course, be understood that modifications of the present invention, in its various aspects, will be apparent to those skilled in the art, some being apparent only after study, others being merely matters of routine electronic and mechanical design. For example, the device of the present invention may be modified to measure parameters of motion other than the intensity of the motion and may be adapted to be attached athletic equipment such as golf clubs and bats. In addition, the processing circuitry 60 may be manufactured as a hybrid or a single monolithic chip. Other emodiments are also possible with their specific designs dependent upon the particular applications. As such, the scope of the invention should not be limited by the particular embodiment herein described but should be defined only by the appended claim and equivalents thereof. The features, of the invention are set forth in the following claim.

We claim:

1. A wrist-worn bowling monitoring device for monitoring the bowling motion of a bowler, comprising:

sensor means for sensing the accleration of the device in three orthogonal axes of motion and providing data representative of the acceleration of the device in the three axes of motion;

first computation means for computing values equal to the square root of the sum of the squares of the acceleration data of each direction;

first comparison means for comparing each of said computed values the to a predetermined threshold;

second computation means for adding each computed value which exceeds the predetermined threshold to provide a total;

second comparison means responsive to the first comparison means for comparing the computed total to a predetermined range if a computed value is found to be less than the threshold;

signal means for providing a first signal if the computed total exceeds the predetermined range and a second signal distinguishable from the first signal if the computed total is less than the predetermined range; and bowler operable input means for inputting a desired total value and a window value, wherein the predetermined range is defined as the desired total value less one-half the window value to the desired total value plus one-half the window value.

* * * * *